United States Patent
Brake

[15] 3,679,746
[45] July 25, 1972

[54] ISOMER ENRICHMENT OF BICYCLOHEXYL-4,4'-DIAMINE

[72] Inventor: Loren D. Brake, Wilmington, Del.

[73] Assignee: E. I. du Pont de Nemours and Company, Wilmington, Del.

[22] Filed: Oct. 27, 1969

[21] Appl. No.: 869,502

[52] U.S. Cl. .................260/563 R, 252/440, 252/446, 252/460, 252/466 PT, 260/563 D
[51] Int. Cl. ..........................................C07c 87/40
[58] Field of Search ............263/563 R, 563 B, 563 P, 563 D

[56] References Cited

UNITED STATES PATENTS

| | | | |
|---|---|---|---|
| 2,606,925 | 8/1952 | Whitman | 260/563 D |
| 3,155,724 | 11/1964 | Authur | 260/563 B |
| 3,347,917 | 10/1967 | Authur | 260/563 B |

*Primary Examiner*—Joseph Rebold
*Assistant Examiner*—D. R. Phillips
*Attorney*—John R. Powell

[57] ABSTRACT

A mixture of the stereoisomers of bicyclohexyl-4,4'-diamine not at equilibrium is converted to a mixture of stereoisomers approaching the equilibrium ratio by heating the mixture of stereoisomers to a temperature of from 150° to 300° C. in the presence of hydrogen at a pressure of from 50 to 5,500 pounds per square inch gage and a total pressure of from 500 to 15,000 pounds per square inch gage, in the presence of from 0 to 200 percent by weight of added ammonia and from 0.001 to 10 percent by weight, calculated as metallic ruthenium, of a ruthenium catalyst supported on an inert carrier, both percentages being based on the weight of a starting material, said catalyst being alkali moderated with from 0.05 to 15 percent of a basic alkali metal compound calculated as the alkali metal. Either essentially pure trans,trans-bicyclohexyl-4,4'-diamine or an enriched mixture of cis,trans- and cis,cis-bicyclohexyl-4,4'-diamine can be recovered.

24 Claims, 1 Drawing Figure

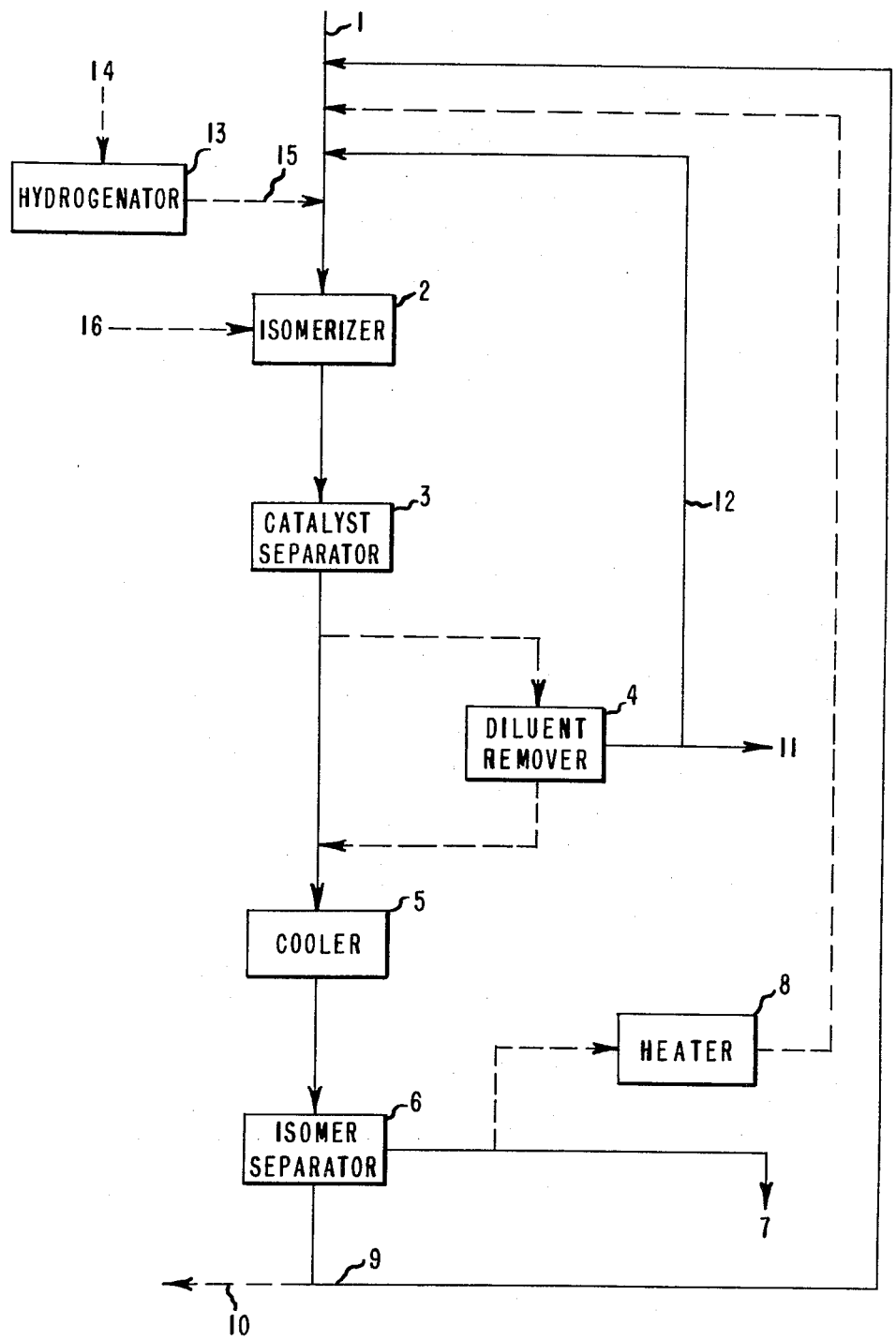

ISOMER ENRICHMENT OF BICYCLOHEXYL-4,4'-DIAMINE

SUMMARY

This invention relates to a method for preparing essentially pure trans,trans-bicyclohexyl-4,4'-diamine or an enriched mixture of cis-trans- and cis-cis-bicyclohexyl-4,4'-diamine According to the invention, essentially pure trans,trans-bicyclohexyl-4,4'-diamine is prepared by a process comprising the steps of:

1. subjecting a material selected from the group consisting of:
   a. a mixture of stereoisomers of bicyclohexyl-4,4'-diamine containing less than the equilibrium concentration of the trans,trans-stereoisomer;
   b. benzidine; and
   c. a mixture of (a) and (b),
to gaseous hydrogen at a hydrogen partial pressure of from 50 to 5,500 pounds per square inch gage and a total pressure of from 500 to 15,000 pounds per square inch gage, at a temperature of from 150° to 300° C. in the presence of from 0 to 200 percent by weight of added ammonia and from 0.001 to 10 percent by weight, calculated as metallic ruthenium, of a ruthenium catalyst supported on an inert carrier, both percentages being based on the weight of starting material, said catalyst being alkali moderated with from 0.05 to 15 percent of a basic alkali metal compound calculated as the alkali metal.

2. dissolving the diamine product of step (1) in a solvent and cooling the solution to a temperature of from 10° to 75° C. to precipitate the trans,trans-bicyclohexyl-4,4'-diamine;

3. recovering the precipitate of step (2) as essentially pure trans,trans-bicyclohexyl-4,4'-diamine.

This invention also contemplates the preparation of a stereoisomeric mixture of bicyclohexyl-4,4'-diamine rich in cis,trans- and cis,cis-bicyclohexyl-4,4'-diamine. This latter process comprises the steps of:

1. subjecting a material selected from the group consisting of:
   a. a mixture of stereoisomers of bicyclohexyl-4,4'-diamine, containing less than the equilibrium concentration of the cis,trans- and cis,cis-stereoisomers;
   b. benzidine; and
   c. a mixture of (a) and (b),
to gaseous hydrogen at a hydrogen partial pressure of from 50 to 5,500 pounds per square inch gage and a total pressure of from 500 to 15,000 pounds per square inch gage, at a temperature of from 150° to 300° C. in the presence of from 0 to 200 percent by weight of added ammonia and from 0.001 to 10 percent by weight, calculated as metallic ruthenium, of a ruthenium catalyst supported on an inert carrier, both percentages being based on the weight of starting material, said catalyst being based on the weight of starting material, said catalyst being alkali moderated with from 0.05 to 15 percent of a basic alkali metal compound calculated as the alkali metal;

2. dissolving the diamine product of step (1) in a solvent and cooling the solution to a temperature of 10° to 75° C. to precipitate trans,trans-bicyclohexyl-4,4'-diamine;

3. separating the precipitate of step (2) and recovering a solution of the stereoisomeric mixture enriched in the cis,trans- and cis,cis-bicyclohexyl-4,4'-diamine.

The processes of this invention are illustrated schematically in the drawing wherein a mixture of stereoisomers of bicyclohexyl-4,4'-diamine, not at equilibrium concentration is isomerized to the stereoisomeric equilibrium.

DESCRIPTION OF THE INVENTION

According to the broad concept of this invention, it is possible to take a single stereoisomer of bicyclohexyl-4,4'-diamine, hereinafter referred to as HPP, or a mixture of any two or all three of the stereoisomers of HPP, characterized in that such stereoisomer or mixture of stereoisomers is at a concentration other than the equilibrium concentration or equilibrium ratio of the stereoisomer or stereoisomers, and by subjecting this HPP to a temperature of from 150° to 300° C. in the presence or absence of ammonia and in the presence of hydrogen and an alkali moderated ruthenium catalyst, the stereoisomer or mixture of stereoisomers is adjusted in concentration or ratio closer to the equilibrium concentration or ratio and, in a preferred embodiment to a concentration or ratio approaching equilibrium, followed by dissolving the HPP in a solvent and cooling the solution to a temperature of from 10° to 75° C. to precipitate trans,trans-HPP, separating the two phases such as by filtration or centrifugation giving a solid phase consisting of greater than 85 percent of the trans,trans-HPP and a liquid phase enriched in cis,cis- and cis,trans-HPP isomers.

It should be understood that the starting materials in the process of this invention are the hydrogenated saturated isomers of HPP.

The expressions "equilibrium concentration" and "equilibrium ratio" are used in their conventional sense to mean the relative proportion of stereoisomeric HPP components in any given HPP product, wherein the stereoisomeric component or components are present in a state of greatest stereoisomer stability and lowest free energy. For the three stereoisomers of HPP, the equilibrium concentration, as well as can be determined analytically, exists in the proportions by weight of about 54.3 percent trans,trans-stereoisomer, about 38.7 percent cis,trans-stereoisomer and about 7 percent cis,cis-stereoisomer.

It will be understood that this invention makes it possible to take a plain mixture of about 35 percent by weight of the trans,trans-stereoisomer, 56 percent by weight of the cis,trans-stereoisomer, and 9 percent by weight of the cis,cis-stereoisomer of HPP and convert this mixture readily to, say, a mixture of 53 percent trans,trans-stereoisomer, 40 percent cis,trans-stereoisomer, and 7 percent cis,cis-stereoisomer. In the other direction from the equilibrium concentration, it is equally simple according to the present invention to take a stereoisomeric mixture containing about 90 percent by weight of the trans,trans-stereoisomer of HPP and about 10 percent of the cis,trans-stereoisomer of HPP and convert this mixture according to the process of the present invention to a mixture containing the three stereoisomers, respectively, in the proportions of approximately 54:40:6.

Following isomerization, the HPP is dissolved in a solvent. The solution is cooled to a temperature of from 10° to 75° C. At this point trans,trans-HPP preferentially precipitates. The precipitated trans,trans-HPP can be recovered most simply by filtration or centrifugation. For optimum operation of the process, the filtrate, which is rich in the cis,cis- and cis,trans-isomers of HPP is recycled to the isomerizer. If enriched cis,cis- and cis,trans-HPP is desired, then the filtrate can be collected as a product and the trans,trans-HPP is returned as a recycle stream to the isomerizer.

The HPP which is fed into the isomerizer can be provided from a separate hydrogenator where benzidine is converted to HPP. The conditions for hydrogenating benzidine via the reaction:

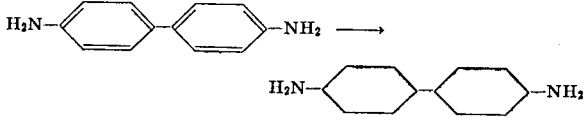

are comparable to those of this invention for achieving stereoisomeric equilibrium for HPP. A method for hydrogenating benzidine is disclosed in copending application Serial No. 813,753 filed Apr. 4, 1969.

It will be readily appreciated that the process for the hydrogenation of benzidine to HPP, wherein such hydrogenation is effected at elevated temperature and pressure and using a caustic moderated ruthenium catalyst supported on an inert carrier can encompass a recycle of part or all of the HPP back into the hydrogenation-isomerization zone where it is subjected to the conditions of the process of the present invention.

Such a recycle operation in HPP manufacture thus permits the preparation of a HPP product at or very close to the equilibrium concentration, which can be followed by crystallization to produce a material high in the trans,trans-stereoisomer. The mother liquor remaining after crystal removal, which is rich in cis,cis- and cis,trans-stereoisomers and heretofore considered either waste and yield loss or in any event not useful for the identical purpose as the HPP at equilibrium concentration or at higher than equilibrium trans,trans-stereoisomer concentrations, is readily recycled back into the hydrogenation-isomerization zone where it is subjected to the conditions of the present invention and rapidly converted to the desired concentration. The reverse is also possible, that is, to retain the liquid or high cis,cis- and cis,transstereoisomer mixture and recycle the high trans,trans-stereo-isomer fraction for isomerization back to equilibrium concentration. Over-all, this achieves a remarkably high yield of the desired product with production of little or no unwanted by-product.

In a recycle operation the amount of material being recycled will, of course, depend on the amount of undesired stereoisomers present as by-products. It will be understood that there will ordinarily be a larger amount of recycle in those operations where the HPP originally produced is farther away from the equilibrium concentration of the mixture of stereoisomers or where the desired stereoisomer content to be obtained by a subsequent separation process is farther from the equilibrium.

Illustrative of the general concept of this invention is the drawing wherein HPP 1 is fed to the isomerization chamber 2. The HPP product at isomer equilibrium is separated from the catalyst 3 and is then sent to the cooler 5 unless the diluent is not suitable for the isomer separation, in which case the diluent is first removed 4 and a suitable solvent added before the HPP is sent to the cooler 5. The chilled HPP is sent to the isomer separator 6 where solid trans,trans-HPP is separated and normally taken off as the product 7. Alternatively the trans,trans-HPP can be heated 8 and recycled to the isomerizer when a liquid product rich in cis,cis- and cis,trans-HPP is desired. The liquid product is taken off from the separator and is normally recycled to the isomerizer 9 but can be recovered as the product 10. Diluent removed from the product can be drawn off 11 or recycled to the isomerizer 12. The HPP feed can originate from an on the site hydrogenator 13 wherein benzidine 14 is converted to HPP 15 and fed to the isomerizer. Alternatively, benzidine can be fed directly 16 to the isomerizer where it is converted to HPP under the conditions of isomerization.

It will be understood by those skilled in the art that this process can be carried out in a batch operation, or in a continuous or semi-continuous operation.

PROCESS CONDITIONS

A. Step 1

In step (1), HPP is subjected to gaseous hydrogen at a hydrogen partial pressure of from 50 pounds per square inch gage to 5,500 pounds per square inch gage and a total pressure of from 500 to 15,000 pounds per square inch gage, at a temperature of from 150° to 300° C. in the presence of from 0 to 200 percent by weight of added ammonia and from 0.001 percent to 10 percent by weight, calculated as metallic ruthenium of a ruthenium catalyst supported on an inert carrier, both percentages being based on the weight of starting material, said catalyst being alkali moderated with from 0.05 to 15 percent of a basic alkali metal compound calculated as the alkali metal.

The alkali moderated ruthenium catalyst will be used according to the present invention in an amount of at least 0.001 weight per cent and less than about 10 weight per cent, based on the starting material and calculated as metallic ruthenium, and preferably in amounts of from 0.01 to 1 percent on the same basis.

The ruthenium catalysts suitable for use in the process of this invention are supported on an inert carrier. Suitable inert carriers are described in Chapter 7 of Catalysis by S. Berkman et al., published by Reinhold Publishing Corp., N.Y. (1940) or Chapter 6 of Catalysis, Vol. 1 by P.H. Emmett published by Reinhold Publishing Corp., N.Y. (1940).

Representative of such carriers are carbon; alumina; barium sulfate; kieselguhr; pumice; diaspore; bauxite; periclase; zirconia; diatomaceous earth; calcium sulfate; calcium oxide; barium carbonate; strontium carbonate; silica; silica-alumina; calcium carbonate; and single or mixed oxides, carbonates, or mixed oxide-carbonates of rare earth metals such as lanthanum, cerium, praseodymium, terbium, dysprosium, holmium, erbium, thulium, ytterbium, lutetium and yttrium. Preferred catalyst supports are alumina; barium sulfate; kieselguhr; carbon; calcium carbonate; rare earth oxides; rare earth carbonates; and mixed rare earth oxide-carbonates. The most preferred support materials are alumina; barium sulfate; and kieselguhr.

The supported ruthenium catalysts can be prepared, for example, by slurrying the support in an aqueous ruthenium chloride solution, precipitating the ruthenium values with aqueous ammonium bicarbonate, digesting at 60° – 90° C., filtering, washing, drying, and activating by means well known in the art. Other means for preparing the catalysts will be obvious to those skilled in the art.

Alkali moderation of the ruthenium catalysts consists of associating a basic alkali metal compound with the catalyst. Preferred basic alkali metal compounds are lithium, cesium, rubidium, sodium and potassium hydroxide, carbonates, bicarbonates, methoxides, ethoxides, propoxides, tert-butoxides and other alkoxides, and sodamide. Alkali moderation can be accomplished by depositing a ruthenium compound on a support from an aqueous solution of sodium or potassium bicarbonate as disclosed in Belgian Pat. No. 691,610, granted Feb. 28, 1967, or by treating a supported ruthenium catalyst prior to reduction with dilute sodium or potassium hydroxide also disclosed in Belgian Pat. No. 691,610, or by treating a supported ruthenium catalyst after reduction, such as in situ treatment of the catalyst with sodium, lithium or potassium methoxide during a hydrogenation reaction also disclosed in Belgian Pat. No. 691,610.

Extent of alkali moderation can be determined by analysis of the treated catalyst for alkali metal content using conventional analytical means such as atomic absorption spectrophotometry. Thus, for example, if a catalyst analyzes 5 weight per cent sodium, it is considered to be alkali moderated to the extent of 5 percent. The extent of alkali moderation can range from 0.05 percent up to 15 percent, depending to some degree on the support. An alumina support, for example, will associate to a different degree with a basic alkali metal compound than will a barium sulfate support. It is preferred that the extent of alkali moderation lie in the range of 0.1 to 10 percent.

This process can be carried out at elevated temperatures and pressures. Temperatures on the order of 150° to 300° C., and preferably about 180° to 225° C., should be used.

The process is run at hydrogen partial pressures above about 50 pounds per square inch gage and preferably from about 500 to 5,500 pounds per square inch gage. Higher hydrogen partial pressures can, of course, be used but little practical advantage is obtained. Similarly lower hydrogen partial pressures can be used, pressures as low as 1 pound per square inch gage still permitting smooth operation. However, yields generally are somewhat poorer at these low hydrogen pressures so that they are ordinarily avoided. Ordinarily, total pressures during isomerization range from about 500 pounds per square inch gage up to about 15,000 pounds per square inch gage, these being practical limits for reasons of cost of operation and equipment.

The isomerization reaction can be carried out in the presence or absence of an inert organic diluent. Suitable diluents include liquids not subject to hydrogenation under the conditions employed. Representative of the suitable diluents are saturated aliphatic and alicyclic hydrocarbons such as cyclohexane, hexane, cyclooctane; low molecular weight alcohols such as methyl alcohol, ethyl alcohol, isopropyl alcohol, n-butanol, and the aliphatic and alicyclic hydrocarbon ethers, such as n-propyl ether, n-butyl ether, ethyl ether, isopropyl ether, isobutyl ether, the amyl ethers, tetrahydrofuran, dioxalane, dioxane, dicyclohexyl ether, and others. Water can also be used as a diluent as can mixtures of two or more of the above diluents.

In a preferred embodiment of this invention, the solvent selected for the isomer separation and isomerization steps is the same. The use of the same solvent in both steps requires fewer process steps and thus permits a more economical synthesis.

When a diluent is used, it can be used in concentrations as low as about 0.2 parts of diluent per part of starting material introduced into the reaction. However, amounts of diluent from about 25 to 150 percent of the weight of starting compound will normally be used. Greater amounts of diluent can, of course, be used, even as high as 1,000 percent to 2,000 percent based on the starting compound, but such amounts merely dilute the components in the reaction mass with no particular advantage obtained.

Ammonia in amounts of from 0 percent to about 200 percent by weight based on the weight of starting material can be used as an additive in the process of this invention, and there appears to be no upper limit to the amount of ammonia which can be present without deleterious effect on the process. The presence of ammonia imparts little or no observable benefit in the isomerization of the stereoisomers of HPP to equilibrium ratio; however, in the hydrogenation of benzidine to HPP it is preferred to have 5 to 40 percent ammonia present, based on the weight of benzidine, to prevent excessive by-product formation.

Following isomerization the catalyst is separated from the product, such as by filtration, and the diluent is removed by distillation if it is not a suitable solvent for the isomer separation step. In a continuous isomerization system the product draw-off can, of course, be arranged to leave the catalyst in the isomerizer eliminating the need for its subsequent separation.

B. Step 2

The HPP recovered from the isomerization step is dissolved in a solvent with heating if necessary and cooled to a temperature between 10° and 75° C. The trans-transisomer will preferentially crystallize in this temperature range. Cooling below 75° C. results in greater cyrstallization of the cis,trans- and cis,cis-isomers.

The crystallization is carried out in the presence of inert organic solvents which are not subject to reaction with HPP under the conditions employed. Representative of the suitable solvents are the aliphatic ethers, such as n-propyl ether, n-butyl ether, ethyl ether, isopropyl ether, isobutyl ether, the amyl ethers, and others; and cycloaliphatic ethers such as dioxane, tetrahydrofuran, and others. A mixture of two or more of the above solvents can be employed.

When a solvent is used, it can be used in concentrations as low as about 1 part per part of HPP. However, amounts of solvent from about 3 to 15 parts by weight per part of HPP will normally be used. Greater amounts of solvent can be used, but impart no particular advantage.

The amine products of this invention tend to form carbonates. Therefore, the use of a closed system during cooling (Step (2)) and filtering (Step (3)) is required.

C. Step 3

The solid material, which is rich in the trans,transisomer is ordinarily collected by filtration or centrifugation. Generally the product will be essentially pure and preferably will contain at least 85 percent of the trans,trans-isomer. The most preferred product will contain 99.9 percent trans,trans-HPP which normally requires the removal of the liquid phase wetting the surface of the solid by washing with an inert organic liquid. Representative of the suitable organic liquids for washing the solids are saturated aliphatic hydrocarbons, such as hexane, pentane, cyclohexane and aliphatic ethers, such as isopropyl ether, n-propyl ether, ethyl ether and others. A second crystallization of the high trans,trans-HPP will produce a product approaching 100 percent purity of the trans,trans-stereoisomer.

When a wash liquid is used, it can be used in concentrations as low as 0.2 part per part of HPP. However, amounts of liquid wash from about 10 to 100 percent of the weight of HPP will normally be used. Greater amounts of wash can, of course, be used, but such amounts have no particular advantages.

The filtrate will be rich in the cis,cis- and cis,trans-isomers. When a product rich in cis,cis- and cis,trans-HPP is sought, it is preferred that their combined fraction total 70 percent by weight of the HPP and most preferably at least 85 percent of the HPP.

Any suitable device for separating solids and liquids can be used to accomplish separation of the solid trans,trans-HPP. Filtration and centrifugation are both convenient and practical and offer an opportunity for washing the solids if desired.

The products of this invention are useful in producing polymers. Thus, the trans,trans- isomers can be reacted with isocyanato-terminated prepolymers according to the process shown in U.S. Pat. No. 2,929,800 to Hill. The cis,trans- and cis,cis-rich isomers can be used as curing agents for bisphenol type epoxy resins. Both types of isomers can be reacted with organic dicarboxylic acids, such as sebacic acid, to form polyamides having a high melting point.

This invention will be better understood by reference to the following illustrative examples wherein parts and percentages are by weight unless otherwise specified.

EXAMPLE 1

In a steel autoclave fitted with a stirring apparatus is placed 100 parts of bicyclohexyl-4,4'-diamine containing about 20 percent trans,trans-stereoisomer, 100 parts dioxane, 10 parts of a catalyst comprising about 5 percent ruthenium on finely divided alumina and 2 parts of sodium methoxide. The mixture is heated to 210° C. with stirring and hydrogen is added to maintain a pressure of 5,000 pounds per square inch gage for 40 minutes. The resulting mixture is freed of catalyst by filtration. Final distillation under vacuum gives the fully saturated mixture of stereoisomers of bicyclohexyl-4,4'-diamine in an amount equal to a recovery of 97.8 percent based on the saturated compounds added. The resulting product stereoisomer content is 5.5 percent cis,cis-, 41.0 percent cis,trans-, and 53.5 percent trans,trans-stereoisomers.

The distillate is dissolved in 500 parts di-n-butyl ether with heating under a nitrogen atmosphere. The resulting solution is cooled to 30° C. under a nitrogen atmosphere. The solid phase is separated by filtration under a nitrogen atmosphere and washed with 100 parts n-hexane to remove the mother liquor from the solid phase. The solid phase is dried overnight with a stream of dry nitrogen. The dried solid phase stereoisomer content is 97.5 percent of the trans,trans-stereoisomer. The liquid phase containing the hexane wash contains HPP having a composition of 12.9 percent cis,cis-, 70.9 percent cis,trans-, and 16.2 percent trans,trans-stereoisomers.

EXAMPLE 2

At a temperature of 225° C. and a hydrogen pressure of 5,000 pounds per square inch gage, 150 parts of bicyclohexyl-4,4'-diamine containing about 25 percent of the trans,trans-stereoisomer, 50 parts di-n-butyl ether, 20 parts of a catalyst comprising about 3 percent ruthenium on finely divided barium sulfate and 3 parts of sodium methoxide are heated for 30 minutes. The resulting mixture is freed of catalyst by filtration. Final distillation under vacuum gives the fully saturated mixture of stereoisomers of bicyclohexyl-4,4'-diamine in an amount equal to a recovery of 97.5 percent based on the saturated starting compounds. The resulting product stereoisomer content is 6.0 percent cis,cis-, 40.0 percent cis,trans-, and 54.0 percent trans,trans-stereoisomers.

The distillate is dissolved in 200 parts of dioxane with heating under a nitrogen atmosphere. The resulting solution is allowed to cool to between 25° and 30° C. overnight under a nitrogen atmosphere. The solid phase is separated by filtration under a nitrogen atmosphere and washed with 150 parts of n-hexane to remove the mother liquor from the solid phase. The solid phase is dried overnight with a stream of nitrogen. The dried solid phase stereoisomer content is about 98 percent of the trans,trans-stereoisomer. The HPP in the liquid phase containing the hexane wash consists of 13.4 percent cis,cis-, 71.4 percent cis,trans-, and 15.2 percent trans,trans-stereoisomers.

Example 3

In a steel autoclave fitted with a stirring apparatus is placed 100 parts of bicyclohexyl-4,4'-diamine containing about 24 percent of the trans,trans-stereoisomer, 100 parts of dioxane, 10 parts of a catalyst comprising about 5 percent ruthenium on finely divided alumina and 2 parts of sodium methoxide. The mixture is heated to 210° C. with stirring in the presence of hydrogen maintained at a pressure of 4,500 pounds per square inch gage for 30 minutes. The resulting mixture is freed of catalyst by filtration. Final distillation under vacuum gives the fully saturated mixture of stereoisomers of bicyclohexyl-4,4'-diamine in an amount equal to a recovery of 97.5 percent based on the starting compound. The resulting product stereoisomer content is 6.5 percent cis,cis-, 40.8 percent cis,trans-, and 52.7 percent trans,trans-stereoisomers.

The distillate is dissolved in 150 parts dioxane with heating under a nitrogen atmosphere. The solution is cooled to 30° C. under a nitrogen atmosphere, filtered to separate the solid phase and washed with n-hexane. The solid phase is dried with a stream of dry nitrogen. The solid phase stereoisomer content is about 97.5 percent of the trans,trans-stereoisomer representing about 40 parts of bicylcohexyl-4,4'-diamine. The liquid phase containing the hexane yields about 54 parts of bicyclohexyl-4,4'-diamine containing about 10.9 percent cis,cis-, 67.2 percent cis,trans-, and 21.9 percent trans,trans-stereoisomers.

EXAMPLES 4 – 7

Example 3 is repeated substituting for the sodium methoxide the alkali metal compound listed below in the amount indicated. Similar results to those of Example 3 are obtained:

| Example | Alkali Metal Compound | Amount |
|---|---|---|
| 4 | Lithium methoxide | 20 parts of 10% solution in methanol |
| 5 | Sodamide | 2.5 parts |
| 6 | Potassium hydroxide | 0.75 part of 50% aqueous solution |
| 7 | Sodium hydroxide | 0.50 part of 50% aqueous solution |

EXAMPLE 8

A solution is prepared consisting of 5.6 parts of ruthenium chloride, 6.7 parts of 37 percent hydrochloric acid, and 67.7 parts of water. This solution is warmed to 65° C., whereupon addition of a solution of 20 parts sodium bicarbonate in 190 parts of water is begun. When 1/3 of the latter solution is added, the support material is dumped into the stirring solution. The support consists of an intimate physical mixture of 50 parts eta alumina and 0.75 parts sodium methoxide. The remaining sodium bicarbonate solution is added at such a rate that approximately 4 minutes is required to add it all. The resulting slurry is then digested for one hour at 65°–70° C., filtered, then washed with 1,200 parts of sodium bicarbonate solution in water. The product is given an additional wash with 800 parts of a 5 percent sodium hydroxide solution in water, then sucked dry. The air dried cake is further dried at 150° C. then activated prior to use at 170°–200° C. in a stream consisting of 95 percent nitrogen and 5 percent hydrogen.

By assay, the above catalyst contains 1.6 percent sodium by weight. Ten parts of the above prepared catalyst is mixed with 100 parts of bicyclohexyl-4,4'-diamine containing about 11 percent cis,cis-, 67 percent cis,trans-, and 22% trans,trans-stereoisomers and 200 parts of dioxane. The resulting mixture is subjected to an atmosphere of hydrogen at 210° C. and a total pressure of 4,000 pounds per square inch gage for 35 minutes. The resulting product is freed of catalyst by filtration. The product stereoisomer content is 7.2 percent cis,cis-, 42.1 percent cis,trans-, and 50.7 percent trans,trans-stereoisomers. The stereoisomers are separated as described in Example 3.

EXAMPLE 9

At a temperature of 210° C. and a total pressure of 5,000 pounds per square inch gage, 100 parts of bicyclohexyl-4,4'-diamine containing about 30 percent of the trans,trans-stereoisomer, 10 parts of a catalyst comprising about 5 percent ruthenium on alumina, 2 parts of sodium methoxide and 90 parts of di-n-butyl ether are subjected to an atmosphere of hydrogen for 30 minutes. The resulting mixture is freed of catalyst by filtration. Distillation under vacuum gives the fully saturated mixture of stereoisomers in an amount equal to a recovery of 97.7 percent based on the starting saturated compound. The product has a stereoisomer content of 6.1 percent cis,cis-, 40.5 percent cis,trans-, and 53.4 percent trans,trans-stereoisomers. The stereoisomers are separated as described in Example 3.

EXAMPLES 10 – 14

The isomerization reaction of Example 9 is repeated substituting for the di-n-butyl ether the solvent listed below in the amount indicated. Similar results to those of Example 9 are obtained.

| Example | Solvent | Amount |
|---|---|---|
| 10 | Di-n-propyl ether | 50 parts |
| 11 | Ethanol | 100 parts |
| 12 | n-Butanol | 75 parts |
| 13 | Tetrahydrofuran | 25 parts |
| 14 | Methanol | 200 parts |

EXAMPLE 15

In a steel autoclave fitted with a stirring apparatus is placed 100 parts of bicyclohexyl-4,4'-diamine containing about 30 percent of the trans,trans-stereoisomer, 100 parts of benzidine, 10 parts of a catalyst comprising about 5 percent ruthenium on finely divided kieselguhr, 1.5 parts of sodium methoxide and 30 parts of ammonia. The mixture is heated to 225° C. with stirring while pressuring with hydrogen to 5,000 pounds per square inch gage and these conditions are maintained until the hydrogen consumption stops. The resulting mixture is freed of catalyst by filtration. Final distillation under vacuum gives the fully saturated mixture of stereoisomers of bicyclohexyl-4,4'-diamine. The resulting product stereoisomer content is 5.9 percent cis,cis-, 41.7 percent cis,trans-, and 52.4 percent trans,trans-stereoisomers.

The resulting distillate is dissolved in 275 parts of dioxane with heating, cooled to 30° C. and filtered to recover the solid phase, all being carried out under a nitrogen atmosphere. The solid phase is washed with 200 parts of n-hexane to remove the mother liquor from the solid phase. The solid is dried overnight with a stream of dry nitrogen. The dried solid stereoisomer content is 98.5 percent of the trans,trans-stereoisomer.

EXAMPLE 16

In a steel autoclave fitted with a stirring apparatus there is placed 2,000 parts of bicyclohexyl-4,4'-diamine containing about 35 percent of the trans,trans-stereoisomer, 60 parts of a catalyst comprising about 5 percent ruthenium on finely divided alumina and 12 parts of sodium methoxide. The mixture is heated to 180° C. with stirring and hydrogen is added to maintain a pressure of 3,000 pounds per square inch gage for 60 minutes. The resulting mixture is freed of catalyst by filtration. Final distillation under vacuum gives the fully saturated mixture of stereoisomers of bicyclohexyl-4,4'-diamine in an amount equal to a recovery of 98.0 percent based on the saturated compound added. The resulting product stereoisomer content is 7.8 percent cis,cis-, 44.0 percent cis,trans-, and 48.2 percent trans,trans-stereoisomers. The stereoisomers are separated as described in Example 3.

EXAMPLE 17

In a steel autoclave fitted with a stirring apparatus and a product draw off system which retains the catalyst in the reactor, there is placed 1,500 parts of bicyclohexyl-4,4'-diamine, 500 parts dioxane and 56 parts of a ruthenium on alumina catalyst recovered from Example 16. The material is heated to 222° C. with stirring and hydrogen is added to maintain a pressure of 4,000 pounds per square inch gage. Additional bicyclohexyl-4,4'-diamine containing about 25 percent trans,trans-stereoisomer, and dioxane in a 3:1 ratio respectively are fed to the autoclave at such a rate as to maintain a 50 minute resident time while the product is drawn off to maintain a fixed reactor volume. Final distillation under vacuum gives the fully saturated mixture of stereoisomers of bicyclohexyl-4,4'-diamine. The product stereoisomer content is 6.5 percent cis,cis-, 40.8 percent cis,trans-, and 52.7 percent trans,trans-stereoisomers.

EXAMPLE 18

A mixture of 200 parts of the bicyclohexyl-4,4'-diamine isomers recovered from Example 17 is dissolved in 1,000 parts of di-n-butyl ether and cooled to 40° C. with stirring and under a nitrogen atmosphere. The solid phase is separated by filtration under a nitrogen atmosphere and washed with 70 parts of di-n-butyl ether and dried with a stream of dry nitrogen. The solid phase stereoisomer content is 99.1 percent of the trans,trans-isomer.

EXAMPLE 19

A mixture of 200 parts of the bicyclohexyl-4,4'-diamine isomers recovered from Example 17 is dissolved in 700 parts of di-isopropyl ether and cooled to 30° C. under a nitrogen atmosphere. The solid phase is separated by filtration under a nitrogen atmosphere and washed with 100 parts of cyclohexane. The solid phase is dried with a stream of dry nitrogen. The solid phase stereoisomer content is 95.7 percent of the trans,trans-stereoisomer.

EXAMPLE 20

A mixture of 500 parts of the bicyclohexyl-4,4'-diamine isomers recovered from Example 17 is dissolved in 2,500 parts di-n-butyl ether and cooled to 30° C. with stirring and under a nitrogen atmosphere. The solid phase is separated by filtration under a nitrogen atmosphere and washed with 400 parts of di-n-butyl ether. The solid is dried overnight with a stream of dry nitrogen. The solid phase stereoisomer content is 2.5 percent cis,trans-, and 97.5 percent trans,trans-stereoisomers.

EXAMPLE 21

A mixture of 200 parts of the solid phase bicyclohexyl-4,4'-diamine recovered in Example 20 is dissolved in 1,000 parts of di-n-butyl ether with heating, and is cooled to 30° C., and filtered to separate the solid phase, all under a nitrogen atmosphere. The solid phase is washed with 200 parts of n-hexane and dried overnight with a stream of dry nitrogen. The solid phase stereoisomer content is greater than 99.9 percent of the trans,trans-stereoisomer.

EXAMPLE 22

A mixture of 100 parts of bicyclohexyl-4,4'-diamine containing about 25 percent of the trans,trans-stereoisomer, 75 parts of di-n-butyl ether, 10 parts of a catalyst comprising about 9 percent ruthenium on barium sulfate, and 1.5 parts of sodium methoxide is heated to 210° C. while pressuring to 4,000 pounds per square inch gage with hydrogen and maintaining the pressure and temperature for 40 minutes. The resulting product stereoisomer content is 6.0 percent cis,cis-, 41.2 percent cis,trans-, and 42.8 percent trans,trans-stereoisomers. The stereoisomers are separated as in Example 18.

EXAMPLE 23

A mixture of 100 parts of bicyclohexyl-4,4'-diamine containing about 25 percent of the trans,trans-stereoisomer, 100 parts of dioxane, 10 parts of a catalyst comprising about 3 percent ruthenium on kieselguhr, and 1.5 parts of sodium methoxide is pressured to 500 pounds per square inch gage with hydrogen and held at 180° C. for 70 minutes. The resulting product stereoisomer content is 6.8 percent cis,cis-, 42.3 percent cis,trans-, and 50.9 percent trans,trans-stereoisomers. The stereoisomers are separated as in Example 18.

24

At a temperature of 200° C. and a total pressure of 5,000 pounds per square inch gage, 150 parts of bicyclohexyl-4,4'-diamine containing about 25 percent of the trans,trans-stereoisomer, 10 parts of a catalyst comprising about 5 percent ruthenium supported on mixed rare earth oxides and carbonates, 0.5 part of potassium tert-butoxide and 50 parts of dioxane are subjected to an atmosphere of hydrogen for 40 minutes. The resulting mixture is freed of catalyst by filtration. Distillation under vacuum gives the fully saturated mixture of stereoisomers in an amount equal to a recovery of 98.0 percent based on the starting compound. The stereoisomers are separated as in Example 18.

EXAMPLE 25

At a temperature of 270° C. and a hydrogen pressure of 4,000 pounds per square inch gage, 100 parts bicyclohexyl-4,4'-diamine containing about 35 percent of the trans,trans-stereoisomer, 100 parts of cyclohexane, 10 parts of a catalyst comprising about 5 percent ruthenium on calcium carbonate, 1 part of sodium methoxide and 10 parts ammonia, are subjected to an atmosphere of hydrogen for 10 minutes. The resulting mixture is freed of catalyst by filtration. Distillation under vacuum gives the fully saturated mixture of stereoisomers. The product has a stereoisomer content of about 6.0 percent cis,cis-, 42.0 percent cis,trans-, and 52 percent trans,trans-stereoisomers. The stereoisomers are separated as in Example 18.

EXAMPLE 26

At a temperature of 225° C. and a total pressure of 5,000 pounds per square inch gage, 150 parts of bicyclohexyl-4,4'-diamine containing about 99 percent of the trans,trans-stereoisomer, 150 parts of methanol, 10 parts of a catalyst comprising about 5 percent ruthenium supported on alumina and 2 parts of sodium methoxide are subjected to an atmosphere of hydrogen for 30 minutes. The resulting mixture is freed of catalyst by filtration. The resulting mixture of stereoisomers consist of 4.0 percent cis,cis-, 37.9 cis,trans-, and 58.1 percent trans,trans-stereoisomers. The stereoisomers are separated by the procedure of Example 18.

I claim:
1. A process for the preparation of essentially pure trans,trans-bicyclohexyl-4,4'-diamine comprising the steps of:
1. subjecting to a temperature of from 150° to 300° C. and a total pressure of from 500 to 15,000 pounds per square inch gauge a reaction mixture consisting essentially of the following components:

I. a starting material selected from the group consisting of:
  a. a mixture of stereoisomers of bicyclohexyl-4,4'-diamine containing less than the equilibrium concentration of the trans,trans-stereoisomer, and
  b. a mixture of (a) and benzidine;
II. gaseous hydrogen at a hydrogen partial pressure of from 50 to 5,500 pounds per square inch gauge;
III. added ammonia in the amount of 0 to 200 percent by weight of the starting material; and
IV a ruthenium catalyst present in the amount of 0.001 to 10 percent by weight of the starting material and calculated as metallic ruthenium, said ruthenium catalyst being supported on an inert carrier, the supported catalyst being alkali moderated with from 0.05 to 15 percent by weight of a basic alkali metal compound calculated as the alkali metal;
2. dissolving the diamine product of step (1) in a solvent and cooling the solution to a temperature of from 10° to 75° C. to precipitate trans,trans-bicyclohexyl-4,4'-diamine; and
3. recovering the precipitate of step (2) as essentially pure trans,trans-bicyclohexyl-4,4'-diamine.

2. The process of claim 1 wherein the starting material is a mixture of stereoisomers of bicyclohexyl-4,4'-diamine containing less than the equilibrium concentration of the trans,trans-stereoisomer.

3. The process of claim 1 wherein the amount of added ammonia is 0 percent.

4. The process of claim 2 wherein the amount of added ammonia is 0 percent.

5. The process of claim 1 wherein the liquid separated from the precipitate of step (3) is recycled to step (1).

6. The process of claim 1 wherein the catalyst carrier is selected from the group consisting of alumina, barium sulfate, kieselguhr, carbon, calcium carbonate, rare earth oxides, rare earth carbonates, and mixed rare earth oxide-carbonates.

7. The process of claim 1 wherein the catalyst carrier is selected from the group consisting of alumina, barium sulfate and kieselguhr.

8. The process of claim 1 wherein the catalyst is moderated with from 0.1 to 10 percent by weight of a basic alkali metal compound calculated as the alkali metal.

9. The process of claim 8 wherein basic alkali metal compound is selected from the group consisting of (i) the hydroxides, carbonates, bicarbonates, and alkoxides of sodium, lithium, cesium, rubidium, and potassium, and (ii) sodamide.

10. The process of claim 1 wherein the temperature in step (1) varies from 180° to 225° C.

11. The process of claim 1 wherein the essentially pure trans,trans-bicyclohexyl-4,4'-diamine contains at least 85 percent trans,trans-bicyclohexyl-4,4'-diamine.

12. The process of claim 1 wherein the essentially pure trans-trans-bicyclohexyl-4,4'-diamine contains at least 99.9 percent trans,trans-bicyclohexyl-4,4'-diamine.

13. A process for the preparation of a stereoisomeric mixture of bicyclohexyl-4,4'-diamine rich in the cis, trans- and cis,cis-stereoisomers comprising the steps of 1. subjecting to a temperature of from 150° to 300° C. and a total pressure of from 500 to 15,000 pounds per square inch gauge a reaction mixture consisting essentially of the following components:

I. a starting material selected from the group consisting of:
  a. a mixture of stereoisomers of bicyclohexyl-4,4'-diamine containing less than the equilibrium concentration of the trans,trans-stereoisomer, and
  b. a mixture of (a) and benzidine;
II. gaseous hydrogen at a hydrogen partial pressure of from 50 to 5,500 pounds per square inch gauge;
III. added ammonia in the amount of 0 to 200 percent by weight of the starting material; and
IV. a ruthenium catalyst present in the amount of 0.001 to 10 percent by weight of the starting material and calculated as metallic ruthenium, said ruthenium catalyst being supported on an inert carrier, the supported catalyst being alkali moderated with from 0.05 to 15 percent by weight of a basic alkali metal compound calculated as the alkali metal;
2. dissolving the diamine product of step (1) in a solvent and cooling the solution to a temperature of from 10° to 75° C. to precipitate trans,trans-bicyclohexyl-4,4'-diamine; and
3. separating the precipitate of step (2) to obtain a solution of the stereoisomeric mixture enriched in cis,trans- and cis,cis-bicyclohexyl-4,4'-diamine.

14. The process of claim 11 wherein the starting material is a mixture of stereoisomers of bicyclohexyl-4,4'-diamine containing less than the equilibrium concentration of the cis,trans- and cis,cis-stereoisomers.

15. The process of claim 11 wherein the amount of added ammonia is 0 percent.

16. The process of claim 12 wherein the amount of added ammonia is 0 percent.

17. The process of claim 13 wherein the precipitate separated in step (3) is recycled to step (1).

18. The process of claim 13 wherein the catalyst carrier is selected from the group consisting of alumina, barium sulfate, kieselguhr, carbon, calcium carbonate, rare earth oxides, rare earth carbonates, and mixed rare earth oxide-carbonates.

19. The process of claim 13 wherein the catalyst carrier is selected from the group consisting of alumina, barium sulfate and kieselguhr.

20. The process of claim 13 wherein the catalyst is moderated with from 0.1 to 10 percent by weight of a basic alkali metal compound calculated as the alkali metal.

21. The process of claim 20 wherein basic alkali metal compound is selected from the group consisting of (i) the hydroxides, carbonates, bicarbonates, and alkoxides of sodium, lithium, cesium, rubidium, and potassium, and (ii) sodamide.

22. The process of claim 13 wherein the temperature in step (1) varies from 180° to 225° C.

23. The process of claim 13 wherein the bicyclohexyl-4,4'-diamine product contains at least 70 percent cis,cis- and cis,trans-bicyclohexyl-4,4'-diamine.

24. The process of claim 13 wherein the bicyclohexyl-4,4'-diamine product contains at least 85 percent cis,cis- and cis,trans-bicyclohexyl-4,4'-diamine.

* * * * *

PO-1050
(5/69)

UNITED STATES PATENT OFFICE
CERTIFICATE OF CORRECTION

Patent No. 3,679,746          Dated July 25, 1972

Inventor(s) Loren D. Brake

It is certified that error appears in the above-identified patent and that said Letters Patent are hereby corrected as shown below:

Column 12, line 28, "Claim 11" should read --Claim 13--; line 32, "Claim 11" should read --Claim 13--; line 34, "Claim 12" should read --Claim 14--.

Signed and sealed this 30th day of January 1973.

(SEAL)
Attest:

EDWARD M. FLETCHER, JR.          ROBERT GOTTSCHALK
Attesting Officer                Commissioner of Patents